United States Patent
Gydell

(12) 
(10) Patent No.: US 6,343,625 B1
(45) Date of Patent: Feb. 5, 2002

(54) DEVICE FOR CREATING A PROTECTIVE SAFETY BARRIER IN A TEXTILE MACHINE

(75) Inventor: Anders Gydell, Hässleholm (SE)

(73) Assignee: Texo AB, Almhult (SE)

(*) Notice: Subject to any disclaimer, the term of this patent is extended or adjusted under 35 U.S.C. 154(b) by 0 days.

(21) Appl. No.: 09/784,003

(22) Filed: Feb. 16, 2001

(30) Foreign Application Priority Data

Feb. 16, 2000 (SE) .............................................. 0000484

(51) Int. Cl.⁷ .............................................. D03D 41/00
(52) U.S. Cl. ...................................... 139/1 R; 139/11
(58) Field of Search .................. 139/1 R, 11

(56) References Cited

U.S. PATENT DOCUMENTS

| | | | |
|---|---|---|---|
| 3,692,065 A | | 9/1972 | Saul ............................ 139/1 C |
| 4,074,725 A | * | 2/1978 | Bader et al. ................ 139/1 R |
| 4,088,157 A | | 5/1978 | Chen et al. .................. 139/1 R |
| 4,365,650 A | * | 12/1982 | Dornier et al. ............. 139/1 R |

\* cited by examiner

Primary Examiner—John J. Calvert
Assistant Examiner—Robert H Muromoto, Jr.
(74) Attorney, Agent, or Firm—Connolly Bove Lodge & Hutz, LLP

(57) ABSTRACT

The present device, as a function of the actuators (i1, i2), creates a deployable and removable barrier of durable and preferably transparent material or arrangement between one or more work stations (6) close to a loom (1) of exceptional width, and moving parts in the machine. The material may be composed of at least one plastic sheeting (10), a matting and/or netting, which can be fed into and out of a storage arrangement (12, 13) in the machine. At least one output feed and inlet feed member (16) in the form of an electric motor, which can be activated by means of the said actuators on the barrier output and input feeds, is assigned to the plastic sheeting, matting or netting.

34 Claims, 2 Drawing Sheets

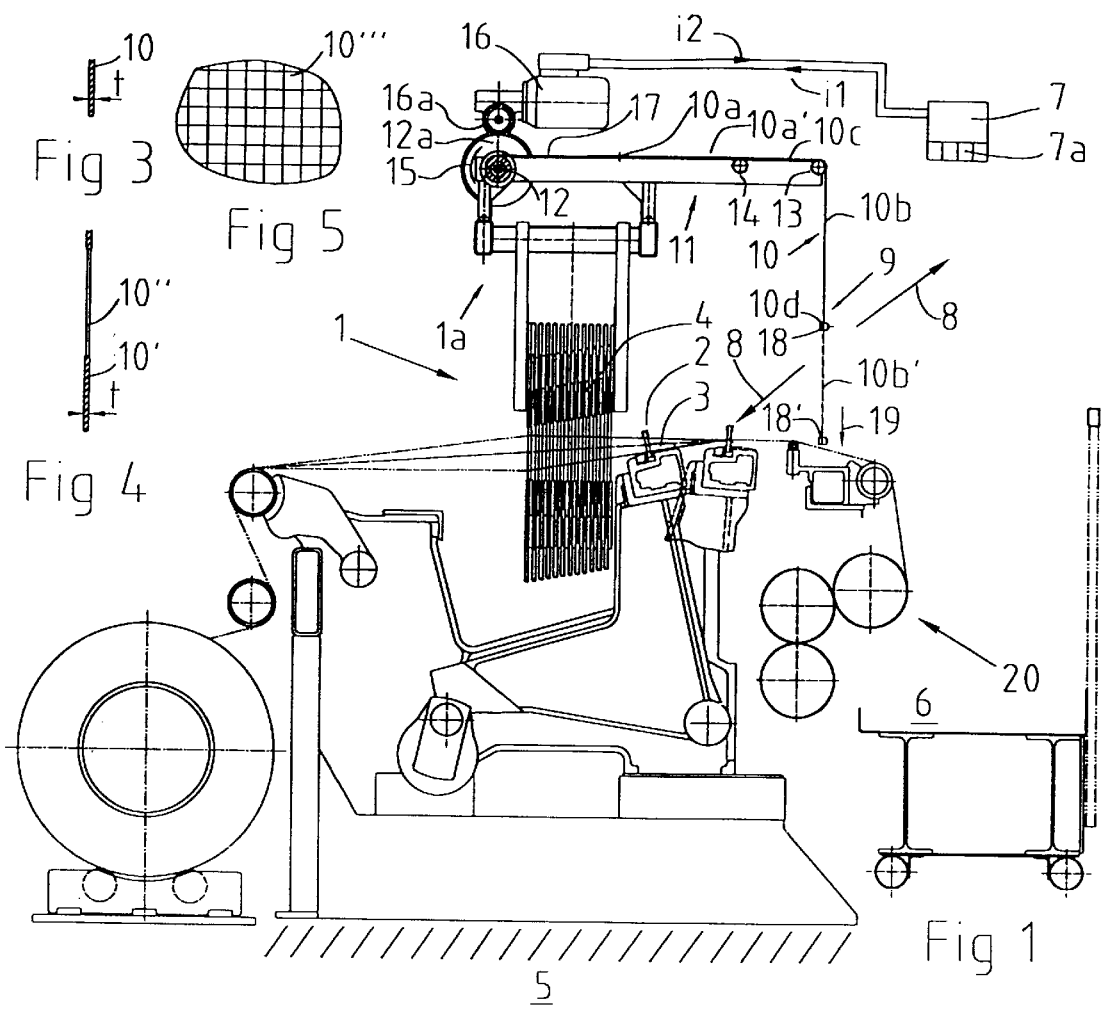
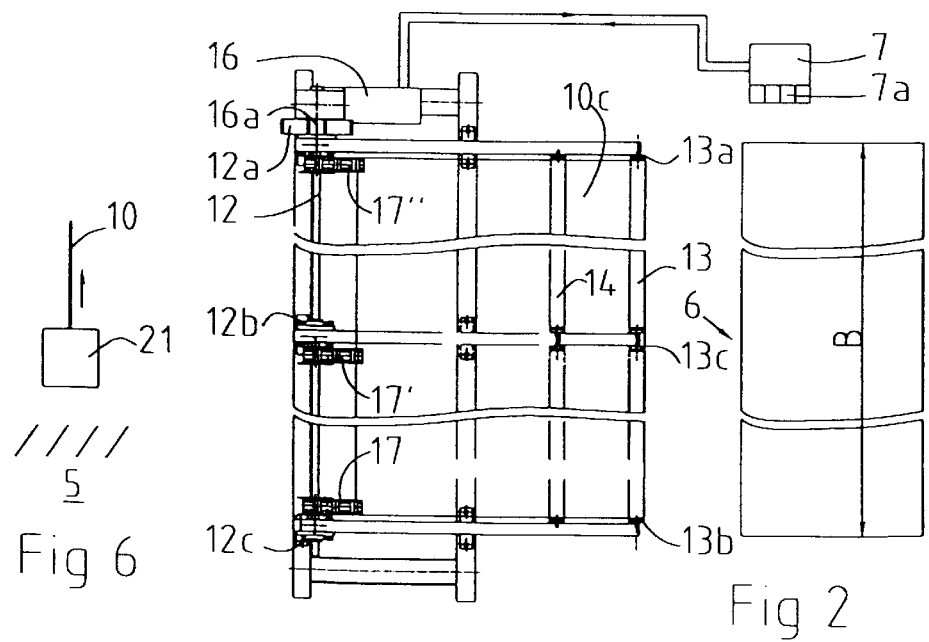

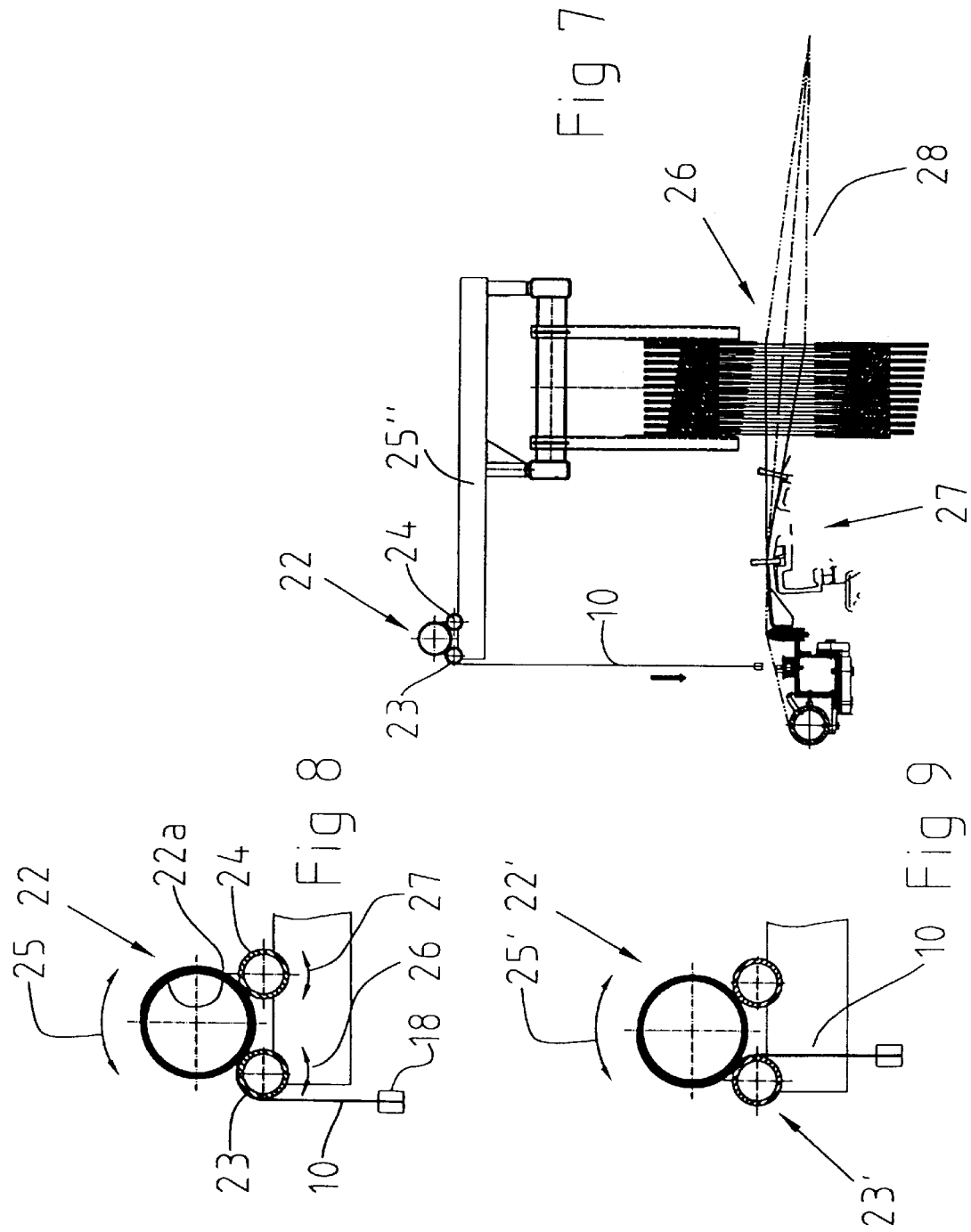

DEVICE FOR CREATING A PROTECTIVE SAFETY BARRIER IN A TEXTILE MACHINE

TECHNICAL SPHERE

The present invention relates to a device for creating, as a function of actuators, a deployable and removable protective safety barrier of durable material between one or more work stations close to a textile machine, especially a loom of exceptional width, and moving parts in the machine, for example shuttle(s), projectile(s), etc.

PRIOR ART

The use of protective safety parts of plastic sheets, which can be applied between a work station close to a loom and the moving parts of the loom, and which can be brought into a safety position before starting the machine, is already known. The object of the protection is to prevent flying parts (cf. said shuttles, projectiles, etc.) and particles being able to injure personnel working at the machine. The protection is also intended to prevent personnel tampering with or getting in the way of the moving parts whilst the machine is in operation. Examples of looms on which the present invention is intended to be used are the TM 300 and TM 400 looms marketed by TEXO AB, SE, on the general market. The barrier or the protection can be deactivated in certain instances and activated in other instances during servicing. It can also be activated in normal operation and deactivated when the machine is at a standstill.

DESCRIPTION OF THE INVENTION

TECHNICAL PROBLEM

It is essential that adequate and effective safety measures can be taken in the case of machines of this type. Particularly in the case of large, heavy and wide looms, for example looms with widths of 2–30 meters weighing 50 tonnes or more, the moving parts operating in the machine are heavy and represent large forces, which can cause serious injury to personnel and damage to the immediate or wider surroundings of the machine if safety measures are not taken. The protection must also be capable of serving as noise and/or dust protection. There is therefore a need for efficiently functioning protection, which must not be too complex or unwieldy, however, since otherwise full use will not be made of it when it is required. The invention is intended, among other things, to solve these problems.

With certain operating functions on the machine the risks of damage or injury are exceptionally high, which means that the protection must be activated in the case of such operating functions. It is advantageous if the protection is designed so that it is activated by and during the said operating functions and removed as soon as these are completed, in order to facilitate effective servicing work at or on the machine. Instead of allowing the person involved to determine when the protection is to be activated or deactivated, the functions and situations in which the protection is to be activated may be pre-selected and the control functions of the loom also allowed to control the activation and deactivation of the protection/the barrier. The invention also solves this problem.

There is also a need for technically simple but nevertheless efficiently functioning protection. In addition the protection must also be capable of installation on machines already set up and installed, without these having to undergo extensive or costly conversion. The invention also solves this problem.

The Solution

A device according to the invention may be regarded as being essentially characterized in that the material consists of at least one sheeting and/or matting and/or of a netting, which can be fed out of and into a storage arrangement, by, in or on the machine. A further characteriztic is that at least one output feed and inlet feed member is assigned to the sheeting, matting netting or the like, for example an electrically controlled member, which can be activated by means of the aforementioned actuators in the output and inlet feeds of the sheeting, matting, netting or the like.

In a preferred embodiment of the idea of the invention, the storage arrangement comprises longitudinal, elongated elements (in the width direction of the loom) arranged against the upper parts of the machine. A first element may be rotatably arranged with a motor, preferably an electric motor. The material may rest at least on a second elongated element of the said elongated element. The second elongated element turns the web of the material down between the work station or work stations and the said moving parts in the loom. When the first element rotates in a first direction, the barrier is lowered and when the first element rotates in the opposite direction the barrier is raised. In a preferred embodiment the sheeting or the like rests on at least one elongated element. The said first element acts on the barrier or the material in order to lower or raise (or remove) it by way of belt-like members, which are fixed both to the first element and to the barrier, preferably to the inner/upper edge thereof. The edge of the barrier being lowered between the work station/work stations and the moving parts of the loom is provided with weights, which cause the down-turned part or section of the barrier to assume an essentially vertical position and for the rest to keep the downturned part in a stable position, so that the barrier can function effectively in the lowered position. The barrier is preferably composed of transparent PVC material and has a thickness of between 1 and 5 mm, preferably approximately 2 mm. In one embodiment a plastic sheeting, plastic matting or plastic netting is used, which extends along the entire width of the machine, that is to say the sheeting, matting or netting may therefore be 2–30 meters wide, for example. In the activated position the sheeting or the like also extends over the entire height of the work station/the machine, which may mean heights or lengths of 1 to 3 meters. In the case of larger machine widths the sheeting, matting or netting can be divided up into two or more sheeting, matting or netting parts, which can thereby be matched to one another at the joints. Activation/deactivation of the sheeting, matting or netting parts can thereby be coordinated or undertaken individually. The actuators for the motor (electric motor) for lowering or raising the plastic sheeting(s), plastic matting(s) or plastic netting(s) consist in a first embodiment of manual actuators, for example pushbutton actuators. In a preferred embodiment, however, the motor for the said lowering and raising operation(s) is coupled to the machine operating control element, so that if the functions that the machine performs or is to perform are pre-selected the operating control elements act upon the motor for lowering and raising the barrier(s). On cessation of each of the pre-selected functions the operating control elements act upon the motor for raising of the barrier(s). In a further embodiment of the idea of the invention one or more of the said elongated elements is/are arranged so as to be capable of rotating with the movements of the barrier(s) when lowering or raising it. Where netting is used in the barrier this may be composed of plastic or other suitable material with mesh sizes between 5 and 30 mm, for example, (depending on what parts the barrier is intended to provide protection against). The mesh size may in itself vary in one and the same barrier. The transparency of the barrier may be achieved by arranging windows of transparent material in an otherwise non-transparent barrier material.

ADVANTAGES

With the solution proposed above use can be made of components already commercially available. A plastic sheeting of PVC plastic or similar fully transparent type is available on the general market. The electric motor arrangement for driving the first element can be designed using known means and the elongated elements used, which extend in the width direction of the machine, may consist of conventional components. The storage arrangement moreover utilizes a space in the machine that is not required by or does not encroach upon the function of the loom or other parts of the loom. The sheeting, matting or netting may be arranged as an effective noise protection that is activated during operation. The dust problem can also be solved by means of the arrangement. The sheeting or the material may in one embodiment take the form of a curtain, blind, etc.

DESCRIPTION OF FIGURES

A device currently proposed and having the typical characteriztics of the invention will be described below with reference to drawings attached, in which FIG. 1 shows an end view of a loom, which utilizes the new sheeting arrangement with plastic or the like and a storage arrangement therefor in order to create a deployable and removable protective safety barrier between a work station and the moving parts in the machine, FIG. 2 shows a plan view of the plastic sheeting arrangement, the storage arrangement and the work station close to a loom of type in question, FIG. 3 shows a vertical section through parts of a plastic sheeting that is used in the equipment according to FIGS. 1 and 2

FIG. 4 shows a vertical section through a protective safety barrier provided with window, it being possible to manufacture the barrier in non-transparent or less transparent material and to achieve the transparency by means of windows of transparent material FIG. 5 shows a front view, partly in vertical section, of parts of a protective safety barrier in the form of netting, FIG. 6 shows a basic end view of the protective safety barrier arranged at the bottom of the machine and raisable from its storage housing, FIG. 7 shows a vertical section through the machine (from the side), and in this a further example of storage elements for a plastic sheeting or curtain, which in the lowered position acts as safety or noise barrier, FIG. 8 shows an enlargement of the example according to FIG. 7, and FIG. 9 shows a vertical section (from the side) through yet another example of an embodiment of storage elements.

DETAILED EMBODIMENT

FIG. 1 shows the principle behind a loom of the type in question. The loom comprises a heald frame machine with a reed arrangement as denoted by 2, a shuttle arrangement as denoted by 3 and a heald frame arrangement as denoted by 4. The loom is installed on a foundation 5 in a weaving shed or the like. A work station 6 for one or more persons/servicing personnel is arranged by the loom. The loom is of the type that operates with automatic control of the relevant loom functions. This includes a control unit 7, which in a manner known in the art controls the various functions of the loom, the control being denoted by the arrows 8.

According to the invention the loom is designed with a safety function in the form of an actuatable protective safety barrier 9, which can be activated and deactivated between the work station 6 and the moving parts 2, 3 and 4 of the loom as a function of actuators. The work station 6, in a known manner, may take the form of a wheel-mounted platform. The protection or the protective safety barrier may consist of a plastic sheeting 10 of durable, transparent material, PVC being one example of such material. A storage space 11 on the upper parts 1a of the machine is assigned to the plastic sheeting. The storage arrangement comprises a number of elongated elements 12, 13 and 14 extending in the width direction of the machine, that is to say in the direction at right angles to the plane of FIG. 1. The plastic sheeting is most commonly storable on at least one such elongated element 13, it being possible to omit the element 14 indicated in FIG. 1. The first elongated element 12 is arranged so that it can rotate both clockwise and anticlockwise. This rotational function is denoted by 15. The rotational function is performed by means of a motor 16, which acts upon the first element by way of a gear arrangement, the gear of the first element being indicated by 12a and the motor gear by 16a. The motor may be of suitable type, for example an electric motor. Alternatively the motor may consist of a hydraulic motor, air motor etc. The plastic sheeting or equivalent protective material is connected to the first element by way of belt-like members, which are fixed both to the first element and to the plastic sheeting 10. The fixing to the first element may be achieved by a known method, for example by adhesive bonding or other method of anchoring. The belt-like members 17 are preferably fixed to the rear/upper end edge 10a of the plastic sheeting. In FIG. 1 the plastic sheeting is shown in its semi-lowered or semi-raised position by solid lines. In this position a part of the plastic sheeting forms a down-turned part 10b and a second part forms a substantially horizontal part 10c. On its lower edge 10d the sheeting is provided with weights 18, which tend to pull the sheeting downward in a vertical direction 19. The weights are of a type such that the down-turned part 10b is placed in a relatively stable position, in which the plastic sheeting can exercise its protective safety barrier function. In the figure the fully lowered position of the plastic sheeting has been shown by dashed lines 10b' and 18'. Here a corresponding new position has been imparted to the horizontal edge 10a'. Actuating signals emitted by the control unit 7 have been indicated by i1 and i2, the actuating signal i1 representing clockwise rotation of the first element 12 and the actuating signal i2 representing anticlockwise rotation of the first element. Additionally or alternatively the control unit 7 may be provided with actuating elements 7a in the form, for example, of push buttons, by means of which a person can issue the said actuating signals i1 and i2 manually.

It will be appreciated from this that the first element in a first direction of rotation performs a lowering function for the plastic sheeting 10, in which lowering function the weight of the weights 18 also assists in drawing the plastic sheeting down. In the opposite direction of rotation the plastic sheeting is drawn in the opposite direction into the storage arrangement, which in the example embodiment is formed by the elements 13 and possibly 14. The said elements can be made so that they also rotate in connection with lowering or raising of the sheeting, the actuating force from the sheeting assisting the said rotation. When lowering or raising, the belt-like members 17 are wound off or on to the first member.

FIG. 2 shows that there may be a larger number of belt-like members 17, and the belt-like members 17, 17' and 17" have been shown as examples. The elongated members 12, 13 and possibly 14 are stored along their longitudinal direction in a number of storage members. The storage members 12b, 12c have been indicated for the element 12 and the storage members 13a, 13b and 13c for the element 13. The number of storage members for each element may be selected according to the length along the width direction of the loom. It will be appreciated that the arrangement described above may be varied without departing from the basic idea of the invention. Thus, for example, the plastic sheeting or similar sheeting may be divided up into a number of segments, which can be controlled together or individually. The storage arrangement may be arranged at the bottom of the machine, the plastic sheeting, when activated, being raised upwards, and when deactivated, being lowered into a suitable storage arrangement. In FIG. 2 the width of the loom is shown by B and in the example of an embodiment the loom has a width of between 2 and 30 meters.

FIG. 4 shows a protective safety barrier, which comprises, on the one hand, non-transparent sections 10', and on the other window sections 10", through which a person viewing from the outside can look into the machine when the barrier is lowered.

FIG. 5 shows examples of a protective safety barrier in the form of a netting, for example plastic netting, with mesh sizes of 5–30 mm, for example. The netting in this case may be made of plastic of the said type and have a filament thickness of 1–5 mm.

FIG. 6 shows a storage housing 21 for a protective safety barrier 10 of type described above and below that can be raised from the storage housing. The direction of raising is shown by an arrow. The housing 21 is in this case arranged at the bottom, for example on the floor or the work station 6, and the sheeting or the like can be fixed or temporarily fastened to belts or other raising members, not shown. Raising may be performed against the action of springs or the like, which return the barrier to the position in the housing when the raising force ceases. In the embodiments with matting or netting the matting(s) or netting(s) may be arranged in a manner similar to or different from that shown for sheeting(s) according to the above. This applies both to the raising and lowering functions and to the control functions. Where sheeting is used the barrier may be regarded as a curtain or blind.

FIG. 1 identifies the direction of lowering of the barrier by the FIG. 19. In this example the barrier can be lowered to a position just above guide bars above the warp thread magazine. The structural parts of the machine and their functions are already known, see, for example, the loom weft element indicated above, which can utilize the invention.

FIGS. 7 and 8 show another storage principle for the barrier, that is the sheeting, matting, netting, curtain etc. In this case a storage reel 22 is used, supported by two storage elements 23, 24. The storage reel and the elements extend in the width direction of the machine, that is to say at right angles to the plane of the figure. The storage reel has a substantially larger diameter, for example a diameter 3 to 4 times larger than the element. The storage reel is rotatable in both its turning directions indicated by arrows 25. When the reel 22 rotates the barrier is wound off from or on to the circumference of the reel. The circumferential surface of the reel thus serves as storage surface. The barrier is fed in and out between the reel 22 and the element 23, which therefore press the barrier material between them. Either or both of the elements 23 and 24 may also be arranged so that they can rotate in directions 26 and 27 respectively. The reel 22 may be designed with a heavy mass and may in principle rest on the elements. The reel and the elements may also bear against one another with a certain spring tension from a spring arrangement, not shown. The reel and/or one or both the elements may be driven by electrical or hydraulic motor(s) according to the above.

It will be seen appreciated that it is advantageous in the drive function if at least the reel and the element 23 rotate and if pressing between the reel and the element contributes to appropriate winding of the barrier material on to and off the circumferential surface 22a of the reel. In FIGS. 7 and 8 a number of turns of the material are wound on to the outer surface. The reel and the elements 23 and 24 are supported on one or more upper parts 25". The heald frame arrangement is indicated by 26 and the reed function by 27. FIG. 7 also shows an open shed for the warp threads 28. The reel and the element(s) may rotate at the same or at different speeds. The number of turns of the barrier material stored on the circumference 22a of the reel depends on the drawn-out length of the barrier.

In FIG. 9 the barrier material runs out and in inside the element 23', rather than outside as in FIGS. 7 and 8. The structure and functions are for the rest identical in both cases, winding off and on being achieved through turns of the reel in the directions 25'.

As stated above, the plastic sheeting may consist of a type known in the art that is preferably made of durable and fully transparent plastic sheeting material. The sheeting is selected with a thickness t in the range 1 to 5 mm, preferably with a value of approximately 2 mm.

The invention is not confined to the embodiments shown above by way of example but may be subjected to modifications within the scope of the claims below. Thus, for example, the barrier may be composed of sheeting and netting.

What is claimed is:

1. A device comprising actuators for creating a deployable and removable barrier of durable material or arrangement between one or more work stations close to a textile machine, wherein the material comprises at least one sheeting, matting and/or netting, which can be fed into and out of a storage arrangement, by, in or on the machine, and that at least one output feed and inlet feed member is assigned to the sheeting, matting and/or netting, which can be activated by means of the said actuators in the output and inlet feeds of the sheeting, matting and/or netting.

2. The device according to claim 1, wherein the storage arrangement comprises elongated elements extending against upper parts of the machine in the width direction of the machine, of which elements at least a first element is rotatably arranged with a motor, so that the sheeting, matting and/or netting rests on at least one second elongated element, which turns the web of the barrier down between the work station or work stations and the said moving parts, and that the first element, in its rotation lowers the barrier from or raises the barrier into the storage arrangement.

3. The device according to claim 2, wherein the barrier material in the storage space rests on at least one elongated element.

4. The device according to claim 2, wherein the first element acts on the barrier for lowering or raising the barrier by way of belt-like members fixed both to the first element and to the barrier material.

5. The device according to claim 1, wherein the barrier material, at its edge that can be brought down between the work station or work stations and the moving parts, is provided with weights, which cause the down-turned part of the barrier to assume a substantially vertical position and for the rest to keep the turned part in a stable position.

6. The device according to claim 1, wherein the barrier comprises a sheeting or matting, which is composed of transparent PVC plastic, with a thickness (t) between 1 and 5 mm.

7. The device according to claim 1, wherein the barrier comprises a netting, with a mesh size in the range of 5 to 30 mm, and filament thicknesses.

8. The device according to claim 1, wherein the actuators of the motor for lowering or raising the plastic sheeting comprises manual actuators.

9. The device according to claim 1, wherein the motor for lowering and raising the barrier is coupled to operating control elements of the machine and that in the case of pre-selected functions in the loom the operating control elements act upon the motor for lowering of the barrier.

10. The device according to claim 8, wherein on cessation of a pre-selected function the operating control elements act upon the motor for raising of the barrier.

11. The device according to claim 1, wherein at least the elongated second element is arranged so that the second element can rotate with the movements of the barrier when lowering or raising it.

12. The device according to claim 1, wherein the storage arrangement comprises a storage reel, which rests on two storage elements, which reel and which elements extend in the width direction of the machine.

13. The device according to claim 12, wherein the barrier material runs out between the reel and the one element by way of its outer or inner side.

14. The device according to claim 12, wherein the storage reel and at least one element are rotatably arranged and that in rotation the barrier material is storable or runs out from the circumference of the storage reel.

15. The device according to claim 3, wherein the barrier material in the storage space rests on at least one elongated element.

16. The device according to claim 3, wherein the first element acts on the barrier for lowering or raising the barrier by way of belt-like members fixed both to the first element and to the barrier material.

17. The device according to claim 2, wherein the barrier material, at the edge of the barrier material that can be brought down between the work station or work stations and the moving parts, is provided with weights, which cause the down-turned part of the barrier to assume a substantially vertical position and for the rest to keep the turned part in a stable position.

18. The device according to claim 3, wherein the barrier material, at the edge of the barrier material that can be brought down between the work station or work stations and the moving parts, is provided with weights, which cause the down-turned part of the barrier to assume a substantially vertical position and for the rest to keep the turned part in a stable position.

19. The device according to claim 4, wherein the barrier material, at the edge of the barrier material that can be brought down between the work station or work stations and the moving parts, is provided with weights, which cause the down-turned part of the barrier to assume a substantially vertical position and for the rest to keep the turned part in a stable position.

20. The device according to claim 2, wherein the barrier comprises a sheeting or matting, which is composed of transparent PVC plastic, with a thickness between 1 and 5 mm, preferably approximately 2 mm.

21. The device according to claim 20, wherein the transparent PVC plastic has a thickness of approximately 2 mm.

22. The device according to claim 1, wherein the barrier material is transparent.

23. The device according to claim 1, wherein the textile machine comprises a loom of exceptional width, and moving parts in the machine.

24. The device according to claim 1, wherein the feed member is an electrically controlled member.

25. The device according to claim 2, wherein the motor is an electric motor.

26. The device according to claim 4, wherein the belt-like members are fixed to the inner/upper edge thereof of both to the first element and to the barrier material.

27. The device according to claim 6, wherein the transparent PVC plastic has a thickness of approximately 2 mm.

28. The device according to claim 1, wherein netting is plastic.

29. The device according to claim 1, wherein the netting has a filament thickness within the range of 1 to 5 mm.

30. The device according to claim 8, wherein the actuators of the motor are on or of push button.

31. The device according to claim 16, wherein the belt-like members are fixed to the inner/upper edge thereof of both to the first element and to the barrier material.

32. The device according to claim 2, wherein the barrier comprises a sheeting or matting, which is composed of transparent PVC plastic, with a thickness between 1 and 5 mm.

33. A device for creating a deployable and removable barrier of durable material or arrangement between one or more work stations close to a machine and a storage arrangement comprising:

actuators to activate the output feeds and input feeds of at least one feed member to create the barrier or arrangement, and a storage arrangement comprising elongated elements extending against upper parts of the machine in the width direction of the machine, of which elements at least a first element is rotatably arranged with a motor, so that the material rests on at least one second elongated element, which turns the web of the barrier down between the work station or work stations and the said moving parts, and that the first element, in its rotation lowers the barrier from or raises the barrier into the storage arrangement.

34. The device of according to claim 33, wherein the material comprises at least one sheeting, matting and/or netting.

* * * * *